United States Patent [19]

Stern

[11] 3,930,847

[45] Jan. 6, 1976

[54] RECOVERY OF COPPER BY CEMENTATION

[75] Inventor: William Richard Stern, Tuscon, Ariz.

[73] Assignee: The Anaconda Company, New York, N.Y.

[22] Filed: Mar. 15, 1974

[21] Appl. No.: 451,497

[52] U.S. Cl................................. 75/109; 75/117
[51] Int. Cl.$^2$............................... C22B 15/12
[58] Field of Search.................... 75/117, 109, .5 A

[56] References Cited
UNITED STATES PATENTS

| | | | |
|---|---|---|---|
| 1,019,708 | 3/1912 | Bennie | 75/117 |
| 1,431,130 | 10/1922 | Soulie-Cottineau | 75/117 |
| 2,647,830 | 8/1953 | Allen et al. | 75/117 X |
| 3,154,411 | 10/1964 | Back et al. | 75/109 |

*Primary Examiner*—G. Ozaki
*Attorney, Agent, or Firm*—Pennie & Edmonds

[57] ABSTRACT

The method of recovering copper by cementation using copper-iron materials as part of the cementation scrap, the copper and iron in said materials being substantially physically inseparable.

5 Claims, No Drawings

RECOVERY OF COPPER BY CEMENTATION

BACKGROUND OF THE INVENTION

Recovery of copper from scrap materials and liquids is assuming increased importance because of the need to maximize copper production due to increased needs for this metal.

Recovery of copper by cementation is an old procedure wherein copper in solutions such as mine waters and leach liquors is precipitated out of solution by the use of metallic iron. The basic cementation reaction is:
$$CuSO_4 + Fe \rightarrow Cu + FeSO_4$$
However, in this reaction some of the ferrous sulfate becomes oxidized to ferric sulfate which results in redissolving of some of the copper to form a copper sulfate as illustrated in the following formula:
$$Cu + Fe_2(SO_4)_3 \rightarrow CuSO_4 + 2 FeSO_4$$
The result is a lower recovery of copper and an increased loss of iron.

Another method of recovering copper is from solid scrap materials where it has been used to clad other metals as in certain bearings and wires. While a great deal of the copper can be separated from such materials by physical means, as by grinding, not all of the copper can be removed. This raises a dual problem, particularly in copper clad iron materials since an appreciable amount of copper is lost and the iron can then not be used again because the copper would contaminate the iron or steel product being formed from such scrap. Such copper clad iron scrap is, therefore, simply slagged. If the copper could be substantially completely removed, the resultant iron scrap could be recycled for use in iron and steel making operations.

SUMMARY OF THE INVENTION

A procedure has now been found wherein recovery of copper by cementation with metallic iron can be made more effective while at the same time enabling the removal of copper from copper clad iron scrap enabling use of the iron scrap. Briefly stated, the present invention comprises the improvement in the recovery of copper from solutions containing the same by cementation by including in the cementation launder copper-iron materials as part of the cementation scrap, the copper and iron in said materials being substantially inseparable physically.

DETAILED DESCRIPTION

It is known that copper mine waters and the solutions obtained from copper leaching operations, whether heat, dump, vat or agitated leach produce solutions which contain copper sulfate and usually small amounts of ferric sulfate. Precipitation of copper from such solutions by replacement with iron results in reduction of the ferric sulfate to the ferrous form with the additional iron present in the scrap resulting in formation of copper.

As discussed above, the competing reaction, wherein the ferrous sulfate becomes oxidized to the ferric form and redissolves the copper, reduces the amount of copper recovered from the solution.

In accordance with the instant invention, the addition of copper clad iron materials to the launder results in not only dissolving of the copper attached to the iron, but aids in reducing the ferric iron to the ferrous form and increases the total amount of copper recovered. Thus, the copper is recovered from the copper-iron material and, at the same time, redissolving of the copper to copper sulfate by oxidization of the ferrous sulfate to ferric sulfate is avoided.

The net result is not only an increase in the amount of copper cemented out of the liquid containing the same, but also recovery of the copper from the copper-iron material and further the ability to then use the iron content of the scrap rather than having it slagged.

The instant invention utilizes for cementation conditions any of those presently used for that purpose. Such conditions are well known to those skilled in this art since production of cement copper by precipitating copper by iron from copper sulfate solutions is an old and well-known procedure.

In addition, any of the usual cementation apparatus can be used, such as the drum or cone-type devices, and the iron scrap used can be detinned scrap iron, sponge or particulate iron, and even shredded automobile scrap.

To the noted iron scrap, there is added the copper clad iron scrap. It is preferred to add sufficient copper-iron scrap so that it comprises at least a major portion by weight of the cementation launder although minor amounts (as low as 10% by weight) of the copper-iron scrap can be used with increased copper recovery resulting.

The instant process is suitable for the recovery of copper from all solutions such as copper mine waters and leach liquors obtained from heat, dump, vat, and agitated leach operations.

Upon recovery of the copper, the iron scrap can be utilized without concern for any copper contamination.

While the invention has been described in connection with a preferred embodiment, it is not intended to limit the invention to the particular form set forth, but, on the contrary, it is intended to cover such alternatives, modifications and equivalents as may be included within the spirit and scope of the invention as defined by the appended claims.

What is claimed is:

1. In the method of recovering copper from solutions containing the same by cementation using iron, the improvement comprising the use of copper-iron materials as part of the cementation launder, the copper and iron in said materials being substantially physically inseparable.

2. The method of claim 1 wherein the copper-iron material is a copper-clad iron scrap.

3. The method of claim 1 wherein the copper-iron material comprises at least a major portion by weight of the cementation launder.

4. The method of claim 1 wherein the solution is a copper leach liquor.

5. The method of claim 1 wherein the solution is a copper mine water.

* * * * *